United States Patent [19]

Ball

[11] 4,225,746

[45] Sep. 30, 1980

[54] OIL-FILLED ELECTRIC CABLE JOINT WITHOUT OIL CHANNEL IN JOINT INSULATION

[75] Inventor: Edmund H. Ball, Bassett, England

[73] Assignee: Pirelli General Cable Works, Limited, London, England

[21] Appl. No.: 41,640

[22] Filed: May 23, 1979

[30] Foreign Application Priority Data

May 31, 1978 [GB] United Kingdom ............... 25826/78

[51] Int. Cl.² ........................................... H02G 15/24
[52] U.S. Cl. ................................ 174/22 R; 174/21 R
[58] Field of Search ..................... 174/15 C, 20, 22 R, 174/21 R, 21 C

[56] References Cited

U.S. PATENT DOCUMENTS

| 2,650,260 | 8/1953 | Sesini et al. | 174/22 R |
| 3,051,770 | 8/1962 | Palmieri | 174/22 R |
| 4,104,479 | 8/1978 | Bahder et al. | 174/22 R |

Primary Examiner—Roy N. Envall, Jr.
Attorney, Agent, or Firm—Brooks, Haidt, Haffner & Delahunty

[57] ABSTRACT

A stop or through joint for high voltage, oil filled electric cables having a central conductor with an oil duct, insulation around the cable conductor and a sheath around the insulation which is slightly spaced, at least in part, from the insulation. The bared conductor ends are electrically joined and are surrounded by insulation which does not have a deliberately added oil channel for supplying oil to the duct. The joint is surrounded by a conductive casing, and within the casing, the cable insulation and the space between the insulation and the sheath has oil under pressure supplied thereto so that with variations of the operating conditions which cause oil flow in the cables, oil flows through the cable insulation so as to maintain the necessary oil content of the cables. Also, a cable system with a plurality of such joints intermediate the terminal ends of the cable system.

9 Claims, 3 Drawing Figures

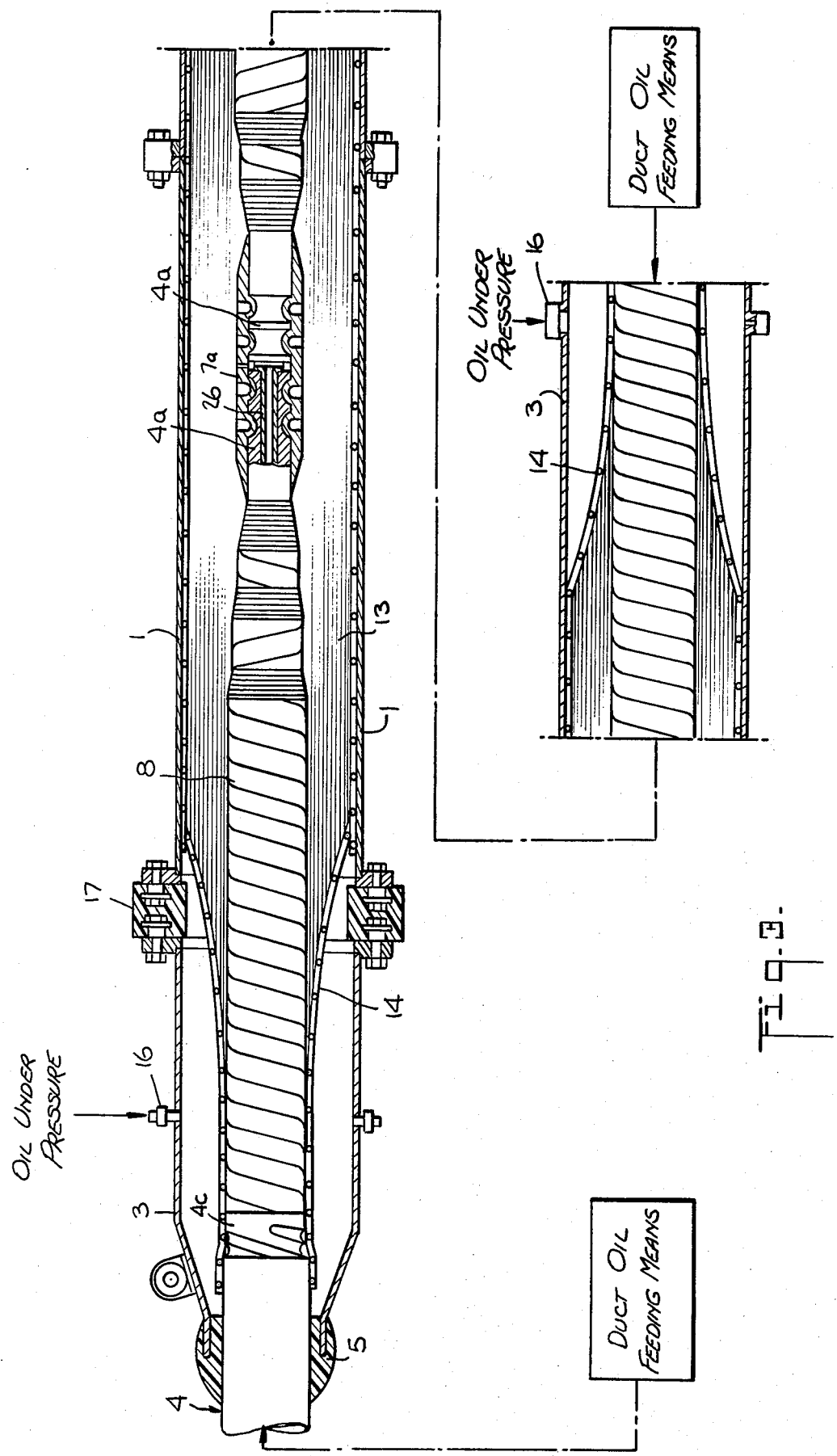

OIL-FILLED ELECTRIC CABLE JOINT WITHOUT OIL CHANNEL IN JOINT INSULATION

This invention relates to an oil-filled cable system for carrying very high voltages and to a joint for interconnecting lengths of cable in such a system.

In a conventional, very high voltage, oil-filled cable system, successive lengths of cable are joined end-to-end by straight or stop joints and the two ends of the system are terminated by sealing ends. In the conventional singlecore system, a central oil duct is provided in the conductor and pressure tanks are connected to appropriate points such as the sealing ends and to each half of each stop joint, thermal expansion and contraction of the oil during load cycling being catered for by oil flowing directly between the conductor duct and the pressure tank at the sealing ends or stop joints.

In each stop joint, a channel is formed through the joint dielectric from the conductor duct to a space between the joint dielectric and the interior surface of the joint casing, to provide for direct flow of oil between the external pressure tank and the conductor duct. Experience has shown that very occasionally this oil channel may introduce a weakness in the electrical insulation not only when the joint is newly constructed but also especially after a period in service when conducting particles suspended in the flowing oil may become deposited on the insulating surfaces of the oil channel.

As seen from one aspect, this invention provides a joint for interconnecting two lengths of oil-filled electric cable, said joint comprises means for electrically interconnecting respective conductors of the two cables, dielectric means for insulating the cable conductors over the jointing zone, and a casing for enclosing the cables and joint dielectric over the jointing zone, the joint casing having at least one port for passage of cable oil to or from the interior of the joint casing, the joint casing interior being in direct communication through the ends of metal sheaths of the cables, with respective spaces between the cable sheaths and their underlying insulating layers, with no special oil channel to the conductor ducts of the cables being provided in the joint dielectric itself.

The joint may be a stop joint or a straight (through) joint.

As seen from a second aspect, this invention provides an oil-filled electric cable system, comprising successive lengths of cable joined end-to-end with joints of the invention and with opposite terminal ends of the cable system terminated by sealing ends, in which the feed of cable oil directly to or from conductor ducts of the system occurs at the terminal, sealing ends only.

Surprisingly, calculations and tests show that a satisfactory flow of oil is to be expected between the joint casing interior and the conductor ducts, this flow taking place through the conductor insulating layers and gradually reducing over a distance of about 1 km measured along the cable from the joint. In particular, calculations show that transient oil pressure increases, that occur upon connecting a cable to electric power, are not expected to be excessive.

An embodiment of this invention will now be described, by way of example only, with reference to the accompanying drawing, in which:

FIG. 3 is a longitudinal section of a through joint.

Figure 1:
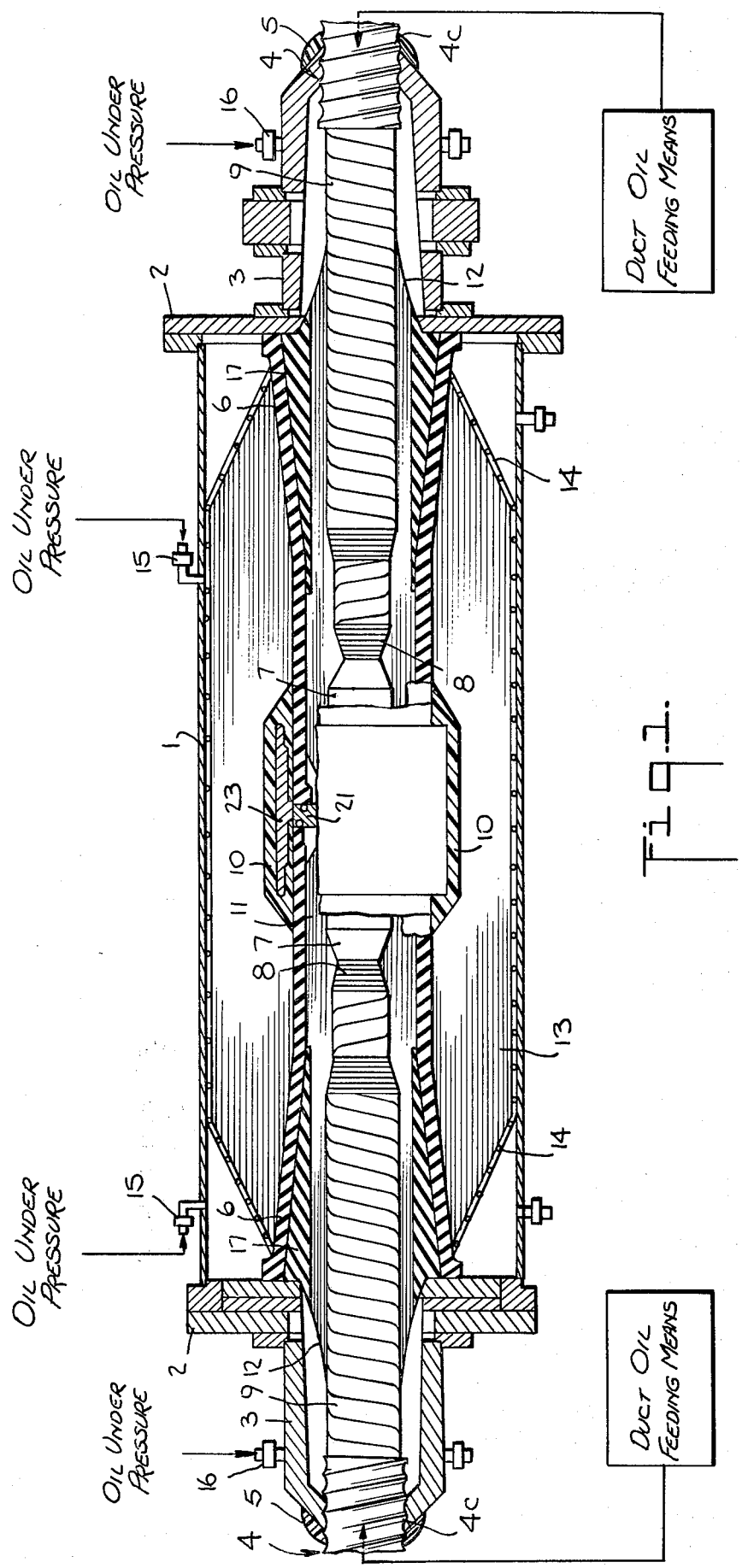
FIG. 1 is a longitudinal section of a stop joint.
Figure 2:
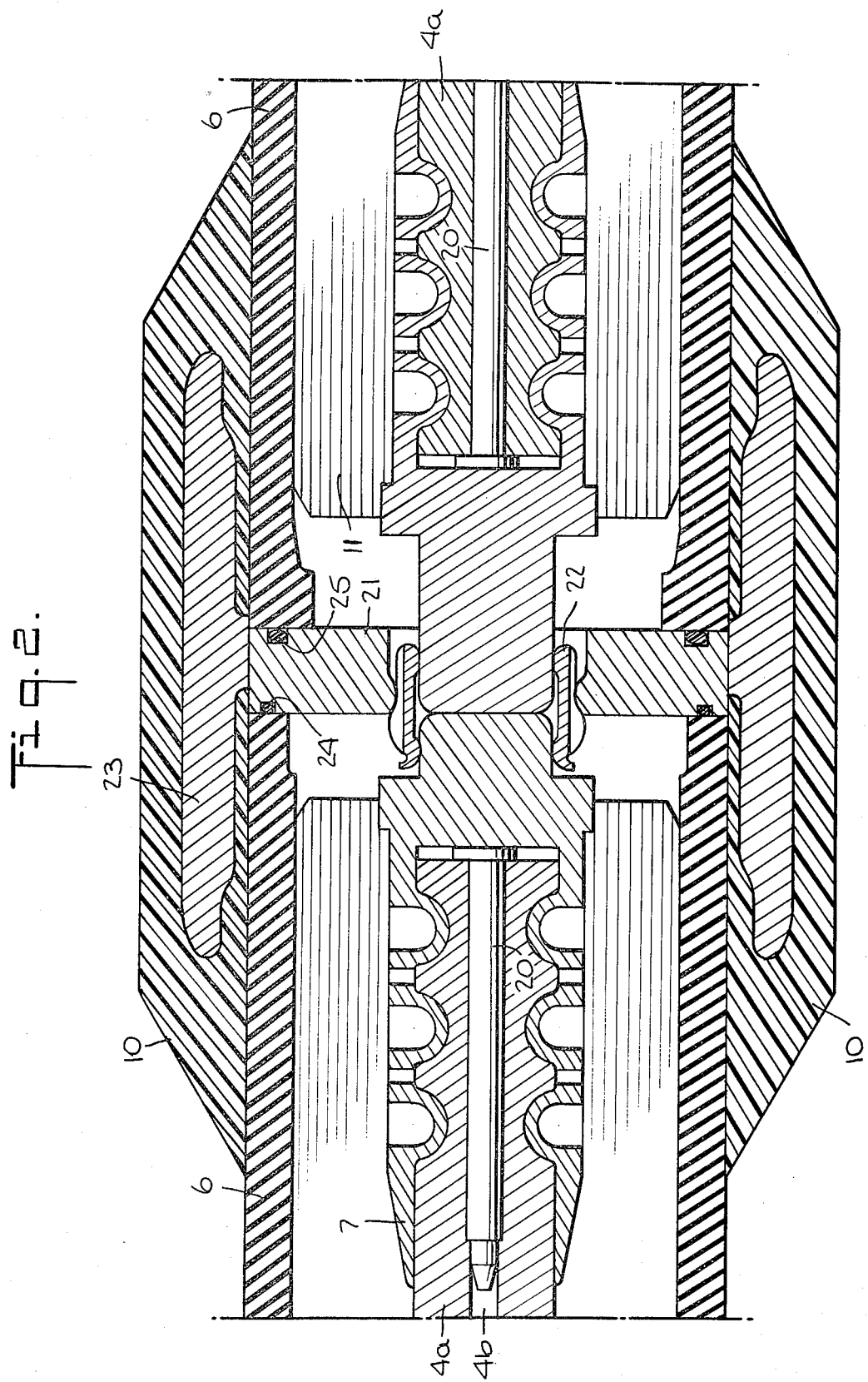
FIg. 2 is an enlarged, fragmentary, cross-sectional view of a portion of the joint shown in FIG. 1.

The stop joint shown in FIGS. 1 and 2 comprise a metal casing, preferably of copper, constituted by a hollow cylindrical part 1 and two annular plates 2 fixed in a fluid tight manner to each end of casing 1 and containing central circular apertures coaxial with the casing, through which the incoming cables pass. Fixed in a fluid tight manner to the outer faces of the annular plates are end caps 3. At its outer end each end cap tapers to a circular end opening through which a respective cable 4 enters the joint and to which the metal sheath of the cable is secured by a plumb wipe 5. Inside casing 1, two trumpet shaped hollow insulators 6 of loaded expoxy resin are fixed in a fluid tight manner to the inner faces of the respective plates 2.

Each cable 4 comprise a conductor 4a having a central oil duct 4b. The conductor 4a is provided with the usual insulating layers 8 and screening layer 9 which are stepped back in the usual way. The screening layer 9 is surrounded by a sheath 4c. A plug 20 is inserted into the end of each conductor to close the central oil duct 4b and each conductor 4a is secured to a joint ferrule 7 by welding or compression jointing. The respective ferrules 7 are electrically connected to each other and to a central metal barrier casting, in the form of a plate 21 of known construction, by a connector 22. A tubular electrode 23, embedded in a loaded epoxy resin moulding 10, surrounds and engages the plate 21. The inner ends of the trumpet insulators 6 remote from plate 2 slidingly fit within the moulding 10 and bear on "O" ring seals 24 and 25 in the barrier plate 21 in a fluid tight manner. Prior to fitting each trumpet 6 the stepped back insulation of the respective cable is built up by hand-applied paper tapes 11 in the usual manner to make a sliding fit with the parallel bore portion of the trumpet insulator 6.

Inwardly tapering epoxy resin sleeves 17 are interposed between the built up insulation 11 and the tapering bores of the trumpet insulators 6, the outer ends being shaped to form, in conjunction with the built up paper insulation 11, a conical surface on which a stress screen 12 is applied. The assembled trumpet insulators and stress assembly 10 are surrounded by preformed paper sleeve insulation 13 and screen 14 and the outer casing 1. The sleeve 17 and the insulators may be oil impenetrable.

Ports, as shown at 15, 16, are provided on the joint casing 1 and the end caps 3 for the oil supply. Contrary to prior art practice, no oil channels are provided through the joint insulation, the oil flowing to and from the cable system by radial flow through the cable dielectric and longitudinal flow between cable core comprising the conductor 4a and the layers 8 and 9 and cable sheath 4c.

The conductor duct 4b is filled with cable insulating oil, which oil also impregnates the cable insulation and fills the space between the insulation and the cable sheath 4c.

In a cable system employing this joint, successive lengths of cable are joined end-to-end by the joint of the invention with opposite, terminal ends of the system terminated by conventional sealing ends. The sealing ends may be coupled to pressure tanks and arranged for the direct feed of cable oil between the pressure tanks and the conductor ducts. At the junction of each pair of cable lengths, the joint shown in the drawing is used, and a pressure tank may be coupled to ports 15, 16, such as by a common feed line. The cable oil cannot flow directly to the conductor duct 4b, because this is closed by the aforementioned plug 20, and no direct oil channel exists through the joint dielectric itself. Also, although oil supplied to the port 15 penetrates the insulation 13 and fills the spaces at its ends, the insulators 16 and 17 do not permit the passage of oil interiorly thereof. Instead, the cable oil passes through port 16 and enters the space between the sheath 4c and the insulation through the end of the sheath. Thus, in accordance with the invention, no oil channels for supplying oil to the ducts 4b are deliberately formed in the sleeve 13 and the insulation 11, or in the insulation 6, 10 and 17 therebetween, and therefore, the insulation around the ferrules 7 and within the casing is uninterrupted by such cahnnels. However, since oil can penetrate through the layers 8 and 9, the layer 8 having minute pores, and into the duct 4b, oil applied under pressure to the layers 8 and 9 within the caps 3 and by way of the space between the sheath 4c and the layer 9 will maintain the desired amount of oil in the cable dielectric and in the duct 4b under conditions normally encountered in practice. Oil will also penetrate into the insulation 11 by way of the screen 12 although this is not required since oil is supplied thereto through the ports 15.

If the differences of level through which the cable route passes do not require the use of stop joints, then straight (through) joints may be used, such as that shown in FIG. 3. The conductors 4a of the two cables, in the example of throughjoint shown, are connected by a compression-applied ferrule 7a, a tube 26 being inserted to bridge the two conductor ducts to prevent deformation of the conductors 4a upon such compression. The insulation and screen over the jointing zone are built up by hand-applied paper tapes and sleeves in known manner and includes no epoxy resin castings. A central portion 1 of the joint casing is joined to an end portion 3 by way of an epoxy resin ring 17 which insulates the end portion 3 from the central portion. The showing of the right hand end of the joint of FIG. 3 has been omitted since it has the same structure as the left hand end shown in FIG. 3.

In the embodiment shown in FIG. 3, oil can penetrate the layer 14 and flow into the space between the sheath 4c and the core comprising the layer 9, which is oil penetrable, and the layer 8, the latter also being penetrable. Thus, oil under pressure supplied to the ports 16 will flow into the space between the sheath 4c and the core and will penetrate the layer 8 and the insulation 13. Because of the ferrule 7a, oil cannot flow radially into the ducts of the cables by way of the insulation 13 which, it will be observed, does not have a radially extending channel for the free flow of oil.

It is calculated that the feed of oil between the conductor duct and pressure tank, in the joints which have been described, is satisfactory, taking place through the cable insulation itself. It is also calculated that the transient pressure occuring upon switching full power to a cable is also satisfactory. By way of example, consider a 400 kV cable having 2500 mm² copper conductor with a 25 mm diameter oil duct, the cable having a corrugated aluminum sheath with a nominal 1 mm clearance between sheath and cable core. In a system in which cable feeding points are spaced at 3000 meter intervals, a full load current of 2,800 amperes is calculated to produce a maximum transient pressure of 0.15 bars in a conventional oil-feed system, and 1.15 bars in a sheath-feed system in accordance with this invention.

It will be appreciated that the prior art problems are avoided, in accordance with the invention, by dispensing with direct feed to the conductor ducts except at the terminal sealing ends. This requires no special cable construction, relying upon the nominal clearance which exists between the corrugated aluminum sheath and the core of the conventional cable.

Although preferred embodiments of the present invention have been described and illustrated, it will be apparent to those skilled in the art that various modifications may be made without departing from the principles of the invention.

What is claimed is:

1. A joint between a pair of oil-filled, electric cables, each of said cables having a core comprising a conductor surrounded by insulation and having a sheath surrounding the core, said sheath being slightly spaced, at least in part, from the core to permit the flow of oil between the sheath and the core and said insulation being penetrable by the oil, said joint comprising:

means electrically interconnecting the conductor of one cable with the conductor of the other cable;

insulation enclosing said means, said insulation being without a channel therein for the free flow of oil from the exterior to the interior thereof and thereby preventing the flow of oil from the exterior thereof to the cable conductors except to the extent that said last-mentioned insulation is itself penetrable by oil;

an oil tight casing surrounding said insulation and said means, said core having a portion thereof spaced from said means which is exposed within said casing, said sheath terminating within said casing at a position spaced from said means to expose the space between said core and said sheath within said casing and said casing having at least one port for supplying oil under pressure to the exposed portion of said core and to said space to maintain the oil within the core.

2. A joint as set forth in claim 1 wherein the conductor of each cable has an oil duct therein extending longitudinally thereof.

3. A joint as set forth in claim 2 further comprising stop means sealing the ends of the conductor oil ducts within said casing.

4. A joint as set forth in claim 2 wherein said stop means comprises a plug in the oil duct of each conductor.

5. A joint as set forth in claim 2 wherein said stop means comprises a ferrule on the end of each conductor in sealed relation to the conductor.

6. A joint as set forth in claim 2 wherein said insulation enclosing said means includes oil impenetrable insulation for preventing the passage of oil radially of said means from the interior of said casing.

7. A joint as set forth in claim 1 or 2 wherein said casing has end portions which surround the exposed portion of the cores and the ends of the sheaths and wherein there is a port in each end portion.

8. A joint as set forth in claim 2 further comprising means interconnecting the duct of one conductor with the duct of the other conductor for the passage of oil therebetween.

9. A cable system comprising a plurality of the joints of claim 2 intermediate the terminal ends of said system and means at each of said terminal ends connected to the duct of each conductor for supplying oil thereto.

* * * * *